United States Patent
McKinley et al.

(10) Patent No.: US 9,590,636 B1
(45) Date of Patent: Mar. 7, 2017

(54) METHOD AND APPARATUS FOR VALIDATING A SYSTEM-ON-CHIP BASED ON A SILICON FINGERPRINT AND A UNIQUE RESPONSE CODE

(71) Applicant: Marvell International LTD., Hamilton (BM)

(72) Inventors: Patrick A. McKinley, Corvallis, OR (US); Walter Lee McNall, Meridian, ID (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 121 days.

(21) Appl. No.: 14/559,017

(22) Filed: Dec. 3, 2014

Related U.S. Application Data

(60) Provisional application No. 61/911,247, filed on Dec. 3, 2013.

(51) Int. Cl.
| | |
|---|---|
| H04L 29/06 | (2006.01) |
| H03K 19/177 | (2006.01) |
| G06F 21/88 | (2013.01) |
| H01L 21/268 | (2006.01) |
| H01L 21/768 | (2006.01) |

(52) U.S. Cl.
CPC ....... *H03K 19/17768* (2013.01); *G06F 21/88* (2013.01); *H01L 21/268* (2013.01); *H01L 21/76892* (2013.01)

(58) Field of Classification Search
CPC .......................... G06F 21/88; H03K 19/17768
See application file for complete search history.

(56) References Cited

U.S. PATENT DOCUMENTS

| | | | |
|---|---|---|---|
| 8,386,990 B1 * | 2/2013 | Trimberger | ........... H01L 23/544 257/798 |
| 8,427,193 B1 * | 4/2013 | Trimberger | .......... H03K 19/003 326/38 |

(Continued)

OTHER PUBLICATIONS

IEEE Std. 802.11-2012; (Revision of IEEE Std. 802.11-2007); IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

(Continued)

*Primary Examiner* — Mohammad A Siddiqi

(57) ABSTRACT

A system-on-chip including circuit instances, a selector module, a circuit instance module, and a comparing module. The circuit instances have respectively nodes. The circuit instances are designed to provide nominally a same value at each of the nodes. The selector module is configured to generate a selection signal. The circuit instance module is configured to (i) monitor states of the nodes, and (ii) based on the selection signal, select (a) two or more of the states of the nodes, or (b) two or more parameter values generated based on the two or more of the states of the nodes. The comparing module is configured to: compare (i) the two or more of the states of the nodes, or (ii) the two or more parameter values; and based on the comparison, output a bit of (i) a silicon fingerprint of the system-on-chip, or (ii) a unique response code of the system-on-chip.

21 Claims, 8 Drawing Sheets

(56) References Cited

U.S. PATENT DOCUMENTS

| | | | | |
|---|---|---|---|---|
| 8,867,739 | B2* | 10/2014 | Danger | G01R 31/31719 380/44 |
| 2008/0282209 | A1* | 11/2008 | Anderson | G06F 21/73 716/106 |
| 2012/0183135 | A1* | 7/2012 | Paral | G09C 1/00 380/44 |
| 2013/0187764 | A1* | 7/2013 | Smith | H04L 9/3271 340/10.42 |
| 2015/0123702 | A1* | 5/2015 | McKinley | H01L 21/265 326/8 |

OTHER PUBLICATIONS 802.16-2009 (Revision of IEEE Std. 802.16-2004); IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

IEEE P802.11ad / D5.0 (Draft Amendment based on IEEE P802. 11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

* cited by examiner

METHOD AND APPARATUS FOR VALIDATING A SYSTEM-ON-CHIP BASED ON A SILICON FINGERPRINT AND A UNIQUE RESPONSE CODE

CROSS-REFERENCE TO RELATED APPLICATIONS

This application claims the benefit of U.S. Provisional Application No. 61/911,247, filed on Dec. 3, 2013. The entire disclosure of the application referenced above is incorporated herein by reference.

FIELD

The present disclosure relates to prevention of system-on-chip (SoC) counterfeiting.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

For secure applications, SoCs (sometimes referred to as chips) are typically designed and built to satisfy certain customer requirements. These requirements can be directed to protecting embedded information, such as encryption keys and other secret information, from being copied without authorization. The requirements can also be directed to (i) authenticating origin and identification of a chip for use in a system, and (ii) preventing others from copying, cloning, and/or building counterfeit copies of the chip. Although the counterfeit copies can operate and appear the same as the original chip, the counterfeit copies can subvert (i) operational intent of the original chip, and/or (ii) business interests of the design and manufacturer of the original chip.

Various design techniques, system architectures, and security programs are used as counter-measures in manufacturing life cycles to protect sensitive information and to provide a check on chip authenticity. Traditionally, these were effective counter-measures to prevent competitors, clone manufacturers and/or chip counterfeiters from copying chips and/or extracting sensitive encryption keys and secret data.

The threat of having a chip copied and/or sensitive information extracted has evolved and included advanced reverse engineering techniques meant to extract key secrets or key circuit functionality from a chip based on logic-based estimates (or educated guesses). Complete physical circuit and memory data extraction from a chip has been performed to enable a counterfeit chip to be designed and produced. While an expensive undertaking, this extraction allows a counterfeit chip to be constructed having the same unique identity and secret keys as an original chip. Counterfeit copies generated using this type of extraction only succeed (i.e. operate the same and/or perform the same functions as the original chip) after replicating physically apparent attributes of the original chip and then correcting for any extraction errors.

An advanced state-of-the-art technique includes examining small portions of a chip layer-by-layer as the chip is deprocessed. Deprocessing of a chip includes stripping a chip layer-by-layer to expose visible features in each of the layers. This is done until reaching the lowest level (or substrate) of the chip. Apparent structures are synthesized in each portion of the chip to provide a netlist of connected device structures. The resulting netlist is simulated in a field-programmable gate array (FPGA). The extraction errors are iteratively resolved until the extracted circuit (i.e. circuit built as a copy of the original chip) begins to operate the same as the original chip. While time consuming, error-prone, and expensive, this technique remains a viable technique to reverse engineer a chip.

SUMMARY

A system-on-chip is provided and includes circuit instances, a selector module, a circuit instance module, and a comparing module. The circuit instances have respectively nodes. The circuit instances are designed to provide nominally a same value at each of the nodes. The selector module is configured to generate a selection signal. The circuit instance module is configured to (i) monitor states of the nodes, and (ii) based on the selection signal, select (a) two or more of the states of the nodes, or (b) two or more parameter values generated based on the two or more of the states of the nodes. The comparing module is configured to: compare (i) the two or more of the states of the nodes, or (ii) the two or more parameter values; and based on the comparison, output a bit of (i) a silicon fingerprint of the system-on-chip, or (ii) a unique response code of the system-on-chip.

In other features, a method of operating a system-on-chip is provided. The system-on-chip includes circuit instances that have respectively nodes. The circuit instances are designed to provide nominally a same value at each of the nodes. The method includes: generate a first selection signal; monitoring states of the nodes; based on the selection signal, selecting (a) two or more of the states of the nodes, or (b) two or more parameter values generated based on the two or more of the states of the nodes; comparing (i) the two or more of the states of the nodes, or (ii) the two or more parameter values; and based on the comparison, generating a bit of (i) a silicon fingerprint of the system-on-chip, or (ii) a unique response code of the system-on-chip.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Traditional SoCs may be cloned using various reverse engineering, deprocessing, and/or extraction techniques. Examples are disclosed below that prevent SoCs from being cloned and/or counterfeit chips from being manufactured. The disclosed examples utilize inherent variability in silicon processing at various nodes in SoCs to generate silicon fingerprints and unique response codes (URCs). The silicon fingerprints and URCs are compared to determine whether to validate the SoCs. Operation of the SoCs is permitted based on results of the validation.

Figure 1:
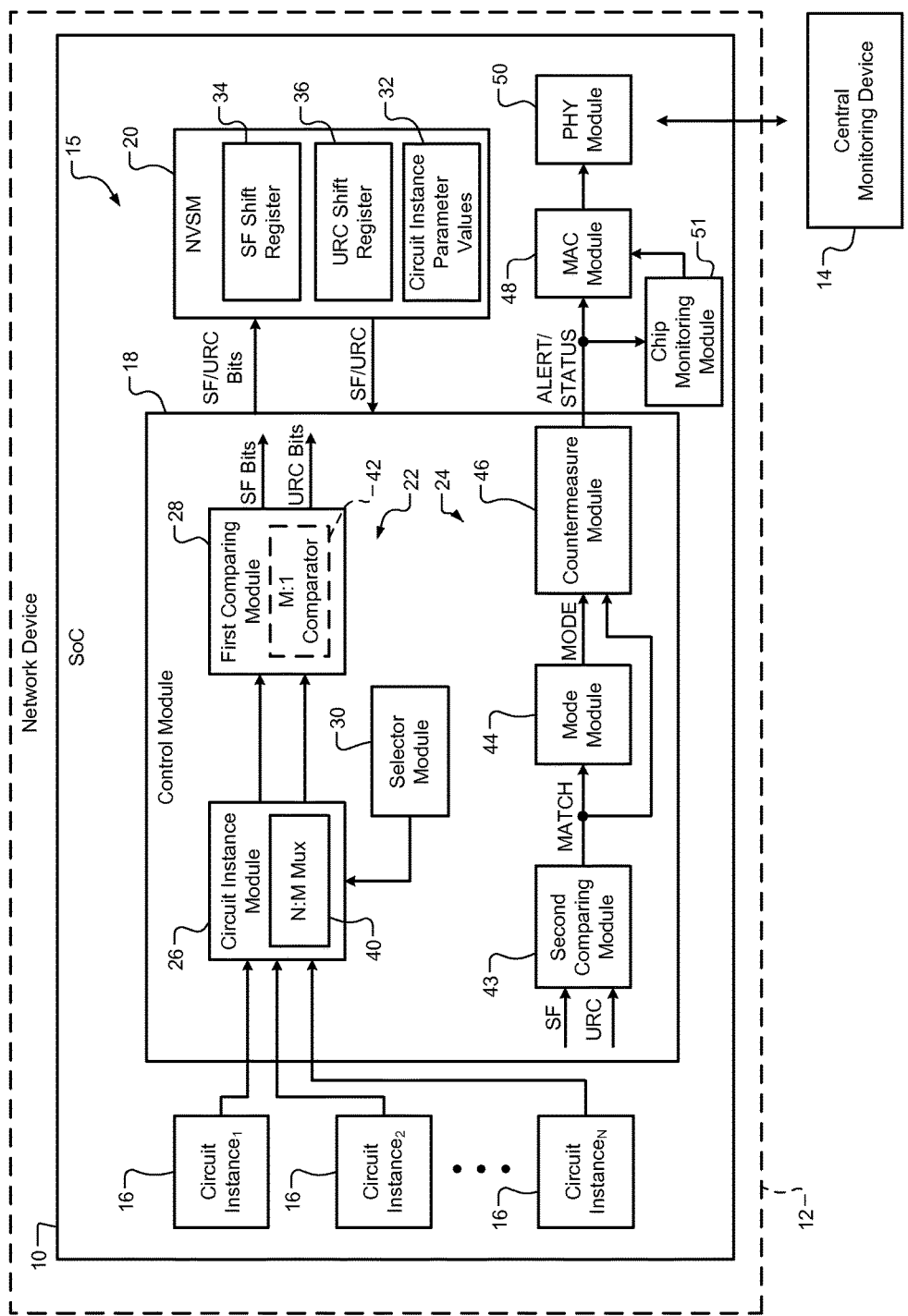
FIG. 1 is a functional block diagram of a system-on-chip (SoC) in accordance with an embodiment of the present disclosure.

FIG. 1 shows a SoC 10. The SoC 10 may be incorporated in a network device 12 or may be a stand-alone chip. The network device 12 may be a computer, a mobile device, a cellular phone or other network device. The SoC 10 may communicate with a central monitoring device 14. The central monitoring device 14 may be a computer, a server, a device controller, or other network device that monitors, tests, authenticates and/or verifies one or more SoCs including the SoC 10. In one implementation, the central monitoring device 14 is in a cloud network.

The SoC 10 includes a sensing system 15 with one or more circuit instances 16, a control module 18, and a non-volatile semiconductor memory (NVSM) 20. A circuit instance refers to a version of circuit, which is monitored by the control module 18. The circuit being monitored may include one or more circuit elements and/or sets of circuit elements in the SoC 10. The circuit elements may include analog and/or digital circuit elements, resistances, capacitances, inductances, diodes, transistors, and/or other circuit elements. Multiple versions of the circuit may exist on the SoC 10. Each of the versions of the circuit is referred to as a circuit instance. The circuit instances 16 may be designed the same, but due to manufacturing variability, the circuit instances 16 may have different outputs and/or states. While in practice, two circuits on a same chip (may be referred to as a die) may be designed the same to provide nominally the same output and/or corresponding parameter value, the two circuits tend to provide (i) outputs that are at least slightly different, and (ii) parameter values that are at least slightly different.

For example, circuit instances$_{1-N}$ may be designed the same to provide a target parameter value X, however each of the circuit instances$_{1-N}$ may provide respectively different parameter values designated $X_{1-n}$. By comparing the parameter values $X_{1-n}$ provided by the circuit instances$_{1-N}$, each of the comparison results may provide a bit having a binary value of '1' or '0'. As an example, if a first value is greater than a second value, then a '1' may be provided. If the first value is less than or equal to the second value, then a '0' may be provided. As an alternative, one of three (non-binary) values may be provided for each comparison. The three values may be −1, 0, 1 or 0, 0.5, 1. If a first value is less than a second value or outside a predetermined range of the second value a '−1' or '0' may be provided. If the first value is equal to or in the predetermined range of the second value a '0' or '0.5' may be provided. If the first value is greater than or outside the predetermined range of the second value a '1' may be provided. The provided values are predetermined and may be different than the examples disclosed herein. Results of the relative comparisons are repeatable, robust and stable across variations in process, voltage, temperature and device lifetime (PVTL) regardless of whether an absolute performance measure of parameter values of each of the circuit instance$_{1-N}$ may vary across PVTL.

As another example, the circuit instances 16 may be implemented as ring oscillators. Although the ring oscillators may be designed the same, there may be variability in frequency outputs of the ring oscillators, such that the frequency outputs of the ring oscillators are not identical. As another example, the circuit instances 16 may be designed to provide nominally a same value (or state) at the same predetermined nodes of the circuit instances 16. However, due to manufacturing variability of the circuit instances 16, the actual values of the circuit instances 16 may not be identical. The values may be within predetermined tolerance ranges of each other, but may not match each other. The SoC 10 may have any number of circuit instances and/or sets of circuit instances. Each set of circuit instances refers to corresponding circuit instances that are designed the same, function the same, and provide the same output. The circuit instances in a set of circuit instances may be located in different areas and/or layers of the SoC 10. The further spaced apart the circuit instances of a set, the more variability may exist between outputs and/or other nodes and/or states of the circuit instances in that set.

The control module 18 may be referred to as a signal analysis state machine and includes a sensor circuit 22 and a validation circuit 24. The sensor circuit 22 determines relative differences between selected outputs and/or states of the circuit instances 16, as a measure of relative performance differences of the circuit instances 16. The relative differences are determined for circuit instances designed to provide nominally a same value (or state). The sensor circuit 22 includes a circuit instance module 26, a first comparing module 28, and a selector module 30. The circuit instance module 26 monitors outputs (or states of nodes) of the circuit instances 16. The outputs may be detected or provided from various nodes (or terminals) in the SoC 10. The circuit instance module 26 may monitor voltages, frequencies of signals, current levels, resistances, power levels, and/or other parameters of the nodes of the circuit instances 16. The parameter values (designated 32) received and/or generated based on the outputs of the circuit instances 16 may be stored in the circuit instance module 26 and/or in the NVSM 20. Nodes other than output nodes of the circuit instances may be monitored, such as input nodes and/or intermediary nodes between the input nodes and the output nodes.

The first comparing module 28 compares parameter values of the circuit instances 16 to generate a silicon fingerprint (SF) of the SoC 10 and/or a URC. The SF may be generated during manufacturing of the SoC 10 and is fixed. The SF is a device specific code or signature for the SoC 10. SF bits generated, as a result of comparing parameter values of the circuit instances 16, are stored in a SF shift register 34 of the NVSM 20 to form the SF of the SoC 10. As an example, a parameter value of each of the circuit instances 16 may be compared with each corresponding parameter value of each other one of the circuit instances 16. Each of the comparison results provides a SF bit that is stored in the SF shift register 34. Any number of comparisons may be performed to provide a corresponding number of SF bits. The SF bits collectively for the SF. As another example, when parameter values being compared match each other or are within a predetermined range of each other, the first comparing module 28 may output a '1'. If the parameter values do not match and/or a difference between the parameter values is outside the predetermined range, the first comparing module 28 may output a '0'.

The URC may be generated post manufacturing of the SoC 10, during a test of the SoC 10, and/or during operation of the SoC 10. The URC is stored in a URC shift register 36 of the NVSM 20 and may be updated. The URC may be generated similar to how the SF is generated. For example, the same outputs and/or nodes of the same circuit instances compared to generate the SF may be compared to generate the URC. The SF provides a reference to which URCs may be compared to determine authenticity of the SoC 10. A SF may be used as a unique identifier for the SoC 10 and may be referred to as a URC. Only certain URCs can be referred to as SFs. The URCs that can be referred to as SFs are first URCs generated during manufacturing and respectively for sets of circuit instances in the SoC 10. URCs generated subsequent to generation of the first URCs are not referred to as SFs. Although the outputs (or states) of the circuit instances may vary from when the one or more SFs are generated to when the URCs are generated, relative differences between the outputs (or states) may remain the same. This allows URCs generated at different times to be compared to a SF to determine if the URCs match the SF.

The selector module 30 controls operation of the circuit instance module 26. This includes instructing the circuit instance module 26 as to which ones of the outputs of the circuit instances 16 and/or corresponding parameter values to compare. As an example, the circuit instance module 26 may include an N:M multiplexer 40, where N and M are integers, N is greater than or equal to M, and M is greater than or equal to 2. Although M may be greater than 2, the below examples are primarily described with respect to M being equal to 2. The selector module 30 may be a state machine (e.g., a 24-way state machine) that selects which of the N inputs of the multiplexer 40 to provide to the first comparing module 28. The first comparing module 28 may include an M:1 comparator 42 that compares the M outputs received from the circuit instance module 26 to provide a comparison result. The comparison result is output from the first comparing module 28 as a SF bit and/or a URC bit. Operation of the modules 26, 28, 30 are further described below with respect to FIGS. 2-3 and 6-8.

The validation circuit 24 includes a second comparing module 43, a mode module 44, and a countermeasure module 46. The second comparing module 43 compares the SF to a generated URC and generates a comparison signal MATCH. The comparison signal MATCH indicates whether the URC matches the SF and/or whether a predetermined number of bits of the URC match corresponding bits of the SF. This indicates whether the SoC 10 is valid or is, for example, a counterfeit SoC. If the URC matches the SF and/or if the predetermined number of bits of the URC matches the SF, then the SoC 10 is valid, otherwise the SoC 10 is invalid.

A match would exist for the SoC 10 and not for counterfeit chips or clones of the SoC 10. The SF stored in the SoC 10 is a result provided by comparing the states of the circuit instances 16. The SF is a unique serial number or pattern specific to the SoC 10, which may be repeatedly generated as a URC by the SoC 10 based on states of the circuit instances 16. Although a counterfeit chip or clone of the SoC 10 may be manufactured and may include a stored copy of the SF, the counterfeit chip or clone of the SoC 10 would not be able to, based on circuit instances of the counterfeit chip or clone, generate a URC that matches the SF. As a result, the SF stored in the counterfeit chip or clone would not match a URC generated by the counterfeit chip or clone. As a result, the counterfeit chip or clone would be identified as invalid.

The mode module 44 selects an operating mode of the control module 18. The control module 18 may operate in a secure mode or may be prevented from operating in the secure mode. The control module 18 operates in the secure mode when the SoC 10 is validated. The mode module 44 selects the operating mode based on the comparison signal MATCH. The operating mode may be indicated by generation of a security signal MODE.

The countermeasure module 46, based on the security signal MODE and the comparison signal MATCH, generates an alert signal and/or a status signal. The countermeasure module 46 and/or the control module 18 may transmit alert signal and/or status signal to the central monitoring device 14 via a medium access control (MAC) module 48 and a physical layer (PHY) module 50. As an alternative, the SoC 10 may be connected, via wires or circuit elements, to the central monitoring device 14 and the countermeasure module 46 and/or the control module 18 may directly transmit the alert signal and/or status signal to the central monitoring device 14. The alert signals may alert the central monitoring device 14 that the SoC 10 did not pass a validation process and/or is not a valid SoC. The status signals may indicate that the SoC 10 is a valid SoC and may also indicate the results of the comparisons between the SF and the URC, as provided by the second comparing module 43 and as indicated by the comparison signal MATCH. The central monitoring device 14, based on the alert signal and/or the status signal, may send a response signal to the SoC 10 indicating whether the SoC 10 is to operate in the secure mode. The mode module 44 may permit operation in and/or prevent operation in the secure mode based on the response signal. The secure mode may include: permitting circuits, modules, and/or memory of the SoC 10 to be powered; and/or permitting the circuits, the modules, and the memory to perform respective tasks.

The SoC 10 may also include a chip monitoring module 51. The countermeasure module 46 may transmit the alert signal and/or the status signal to the chip monitoring module 51. The chip monitoring module 51 may then determine whether to perform a countermeasure and/or forward the alert signal and/or the status signal to the central monitoring device 14. The countermeasures that may be performed by the chip monitoring module 51 and/or the central monitoring device may include: preventing the SoC 10 from operating in the secure mode; signaling the mode module (or a power module of the SoC 10) to depower one or more circuits, areas, modules, memory, etc. of the SoC 10; signaling the mode module to prevent further operations by one or more circuits, areas, modules, memory, etc. of the SoC 10; and/or other suitable countermeasures. The countermeasures that may be performed by the chip monitoring module 51 and/or the central monitoring device may be performed if one or more conditions exist. For example, a countermeasure may be performed when a predetermined number of bits and/or values of a URC of the SoC 10 do not match corresponding bits and/or values of a SF of the SoC 10.

The NVSM 20 includes solid-state memory and/or the SF shift register 34 and one or more URC shift registers (the URC shift register 36 is shown). The SF shift register 34 stores the SF of the SoC 10. The SF may be generated and stored in the NVSM 20 during manufacturing of the SoC 10 and is unchanged. The URC register(s) store URCs generated post manufacturing of the SOC 10 and during testing and/or in-field operations of the SoC 10. A URC stored in the URC shift register 36 may be replaced with an updated URC.

Figure 2:
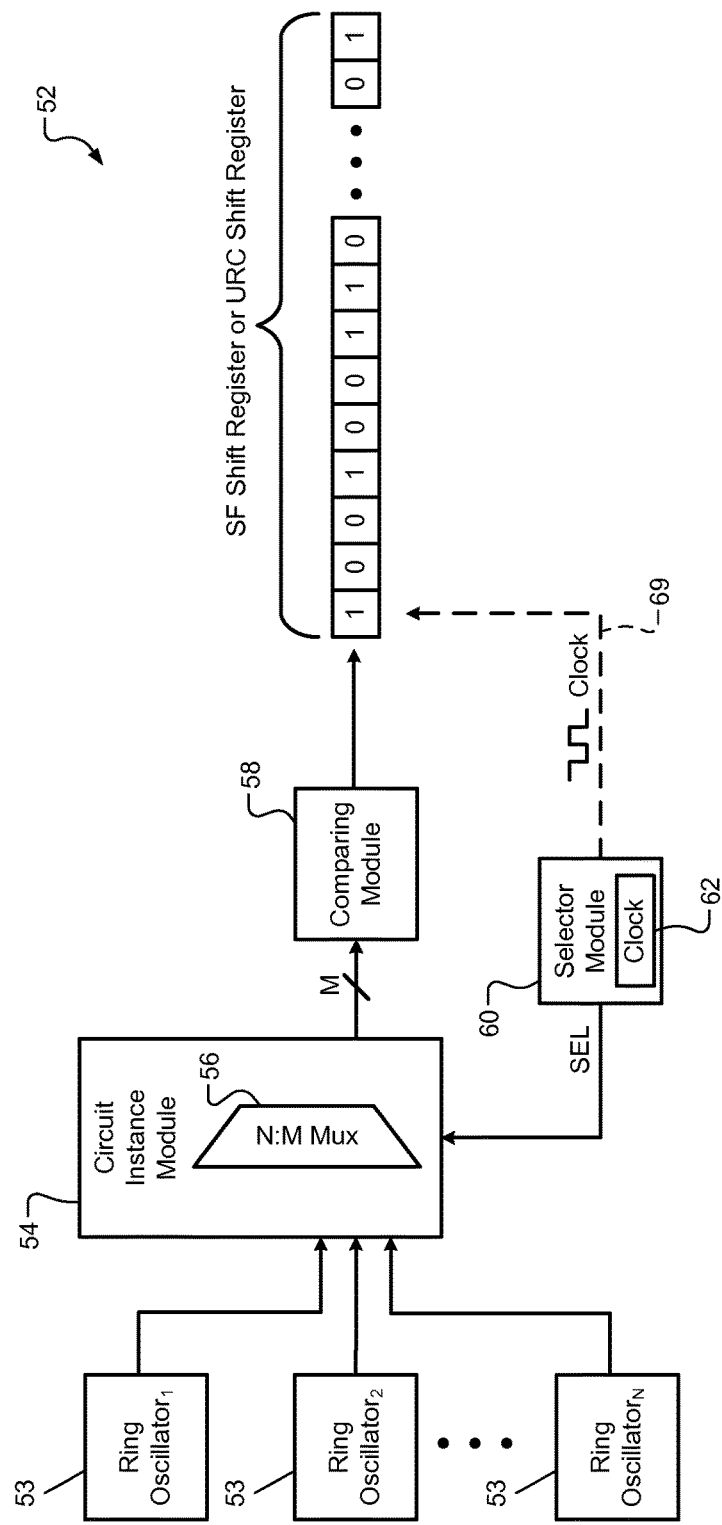
FIG. 2 is a functional block diagram of a unique response code (URC) system incorporating ring oscillators as circuit instances in accordance with an embodiment of the present disclosure.

FIG. 2 shows a URC system 52 incorporating ring oscillators 53 as circuit instances. Although the circuit instances are shown as ring oscillators, the circuit instances may include other and/or additional circuit elements. The URC system 52 also includes: a circuit instance module 54 that includes an N:M multiplexer 56 (hereinafter the multiplexer); a comparing module 58; and a selector module 60. The circuit instance module 54 receives the outputs of the ring oscillators 53.

The multiplexer 56 may be an analog or digital multiplexer and may receive at respective inputs of the multiplexer 56 the outputs of the ring oscillators 53. The multiplexer 56 selects two or more of the outputs of the ring oscillators 53. This selection is based on a selection signal SEL from the selector module 60. The circuit instance module 54 may then determine a natural frequency $f_{RO}$ (or frequency of the outputs) during a predetermined or corresponding time period. The time periods may be based on a clock signal generated by and/or from the selector module 60. The selection signal SEL may be generated based on the clock signal and/or the clock signal may be provided to the circuit instance module 54. The circuit instance module 54 provides the determined frequencies of the selected outputs of the ring oscillators 53 to the comparing module 58.

The comparing module 58 (i) compares the determined frequencies of outputs of the ring oscillators 53, and (ii) outputs SF bits and/or URC bits depending upon whether a SF and/or a URC is being generated. This comparison may be performed based on timing of when outputs of the circuit instance module 54 are provided to the comparing module 58 and/or based on the clock signal, which may be provided to the comparing module 58. A SF is generated during manufacturing of a corresponding SoC. A URC is generated during testing and/or operation of the corresponding SoC. The SF bits or URC bits are stored in a corresponding register (e.g., the SF shift register 34 or the URC shift register 36 of FIG. 1). The comparing module 58 may compare parameter values similar to the comparing module 28. For the example shown, when the selected outputs match each other or are within a predetermined range of each other, the comparing module 58 may output a '1'. If the outputs do not match and/or are outside the predetermined range from each other, the comparing module may output a '0'. As an alternative, one of three (non-binary) values may be provided for each comparison. The three values may be −1, 0, 1 or 0, 0.5, 1. If a first value is less than a second value a '−1' or '0' may be provided. If the first value is equal to the second value a '0' or '0.5' may be provided. If a first value is greater than a second value a '1' may be provided.

The selector module 60 may include a clock 62 that generates the clock signal. The selector module 60 may select inputs of the multiplexer 56 based on the clock signal. As a result, the multiplexer 56 and the comparing module 58 may provide the SF bits or the URC bits based on the clock signal. This is illustrated by the dashed line 69 in FIG. 2.

Figure 3:
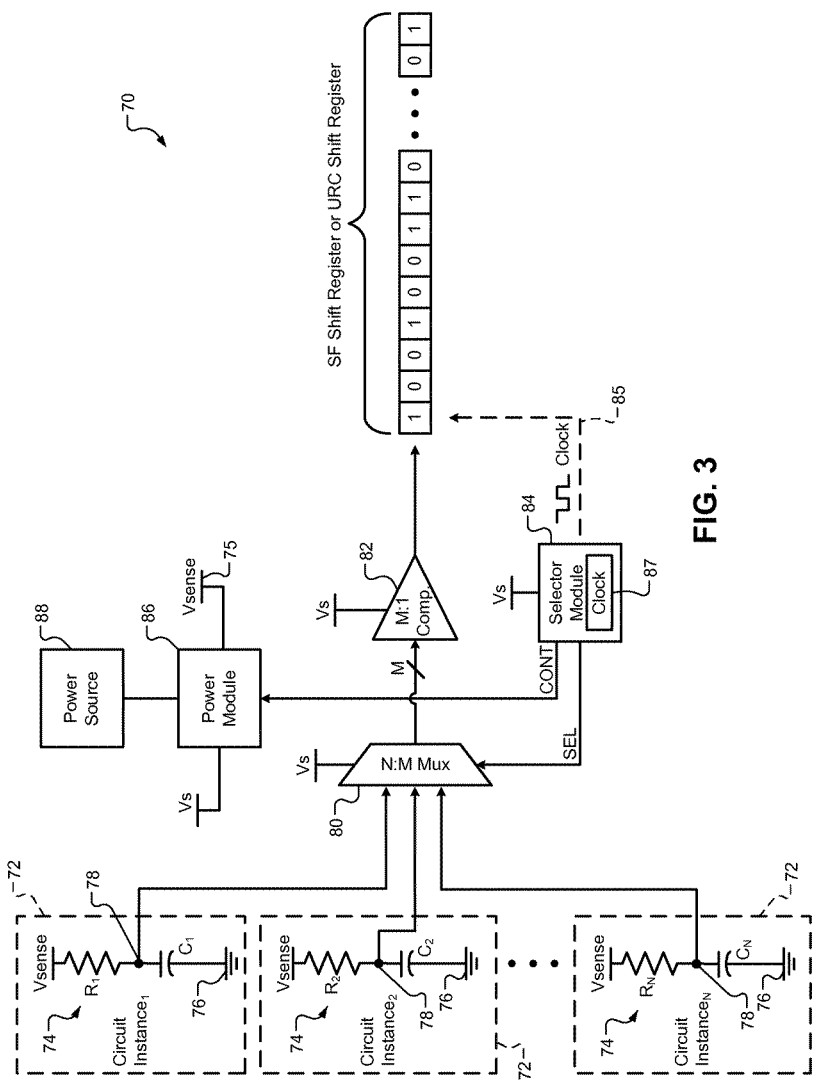
FIG. 3 is a functional block diagram of another URC system incorporating resistance-capacitance (RC) circuit instances in accordance with an embodiment of the present disclosure.

FIG. 3 shows a URC system 70 incorporating circuit instances 72. Although the circuit instances 72 are shown including resistance-capacitance (RC) circuits 74, the circuit instances 72 may include other and/or additional circuit elements. Each of the circuit instances 72 may be referred to as sensors (or chip sensor circuits) and includes a voltage supply rail 75, a resistance, and a capacitance. Resistances $R_{1-N}$ and respective capacitances $C_{1-N}$ are shown, where N is greater than or equal to 2 and refers to a total number of resistances and a total number of capacitances. Each of the resistances $R_{1-N}$ is in series with a respective one of the capacitances $C_{1-N}$ between the voltage supply rail 75 and a ground reference 76. The resistances $R_{1-N}$ receive a voltage via the voltage sensor rail 75. Output voltages may be detected at output terminals (or nodes) 78 between the respective RC pairs of the circuit instances 72.

The URC system 70 also includes an N:M multiplexer 80 (hereinafter the multiplexer), an M:1 comparator 82 (hereinafter the comparator), a selector module 84, and a power module 86. The multiplexer 80 may be an analog or digital multiplexer. The output terminals of the circuit instances 72 are connected to respective inputs of the multiplexer 80. The multiplexer 80 receives output voltages of the circuit instances 72 as detected at the nodes 78. The selector module 84 selects two or more of the input voltages of the multiplexer 80 and generates a selection signal SEL. The multiplexer 80 provides the selected input voltages to the comparator 82 based on the selection signal SEL.

The comparator 82 (i) compares the selected output voltages, and (ii) outputs SF and/or URC bits depending upon whether a SF or a URC is being generated. The SF is generated during manufacturing of a corresponding SoC. A URC is generated during testing and/or operation of the SoC. The SF bits or URC bits are stored in a corresponding register (e.g., the SF shift register 34 or the URC shift register 36 of FIG. 1). The comparator 82 may compare parameter values similar to the comparing module 28. For the example shown, when the selected outputs match each other or are within a predetermined range of each other, the comparator 82 may output a '1'. If the outputs do not match and/or are outside the predetermined range from each other, the comparing module may output a '0'. As an alternative, one of three (non-binary) values may be provided for each comparison. The three values may be −1, 0, 1 or 0, 0.5, 1. If a first value is less than a second value a '−1' or '0' may be provided. If the first value is equal to the second value a '0' or '0.5' may be provided. If a first value is greater than a second value a '1' may be provided.

The selector module 84 may include a clock 87 that generates a clock signal. The selector module 84 may select N inputs (e.g., 2 or more inputs) of the multiplexer 80 based on the clock signal. As a result, the multiplexer 80 and the comparator 82 may provide the SF bits or the URC bits based on the clock signal to the register. This is illustrated by the dashed line 85 in FIG. 3.

As an example, the selector module 84 controls the multiplexer 80 and selects two of N inputs (referred to as input A and input B) from the circuit instances 72. The two selected inputs are provided to the comparator 82, which may output either a binary value of "0" or "1" or other resulting value based on input A being greater than, less than, equal to, or inside a predetermined range of input B. A comparison result is shifted into the register, and then the selector module 84 continues to next combinations of the circuit instances 72. The number of comparisons is directly related to a resulting length of the URC generated. Given process and inter-die variations, although the RC circuits are designed nominally to have the same resistances and capacitances, actual values of the resistances and the capacitances may vary such that bits of the URC provide a unique pattern specific to the SoC.

The power module 86 may generate a power supply voltage Vsense to activate the circuit instances 72. The power supply voltage Vsense is provided at the voltage supply rail 75. The power module 86 may also generate a power supply voltage Vs, which may be provided to the multiplexer 80, the comparator 82 and the selector module 84. The power module 86 may generate the supply voltages Vsense and Vs based on power from a power source 88. The power source 88 may be external to the corresponding SoC.

The selector module 84 may provide the clock signal and/or a control signal CONT to the power module 86 indicating when to generate the power supply voltage Vsense. The power module 86, based on the signal received from the selector module 84, may raise a voltage of the voltage supply rail 75 to a predetermined voltage during sensing and prior to and/or at a beginning of a comparison period. The resistances $R_{1-N}$ limit charging currents into the capacitances $C_{1-N}$, such that at respective sampling times voltages across the capacitances $C_{1-N}$ are sampled. The multiplexer 80, the comparator 82 and the selector module 84 may be powered ON and operate based on the power supply voltage Vs.

Figure 4:
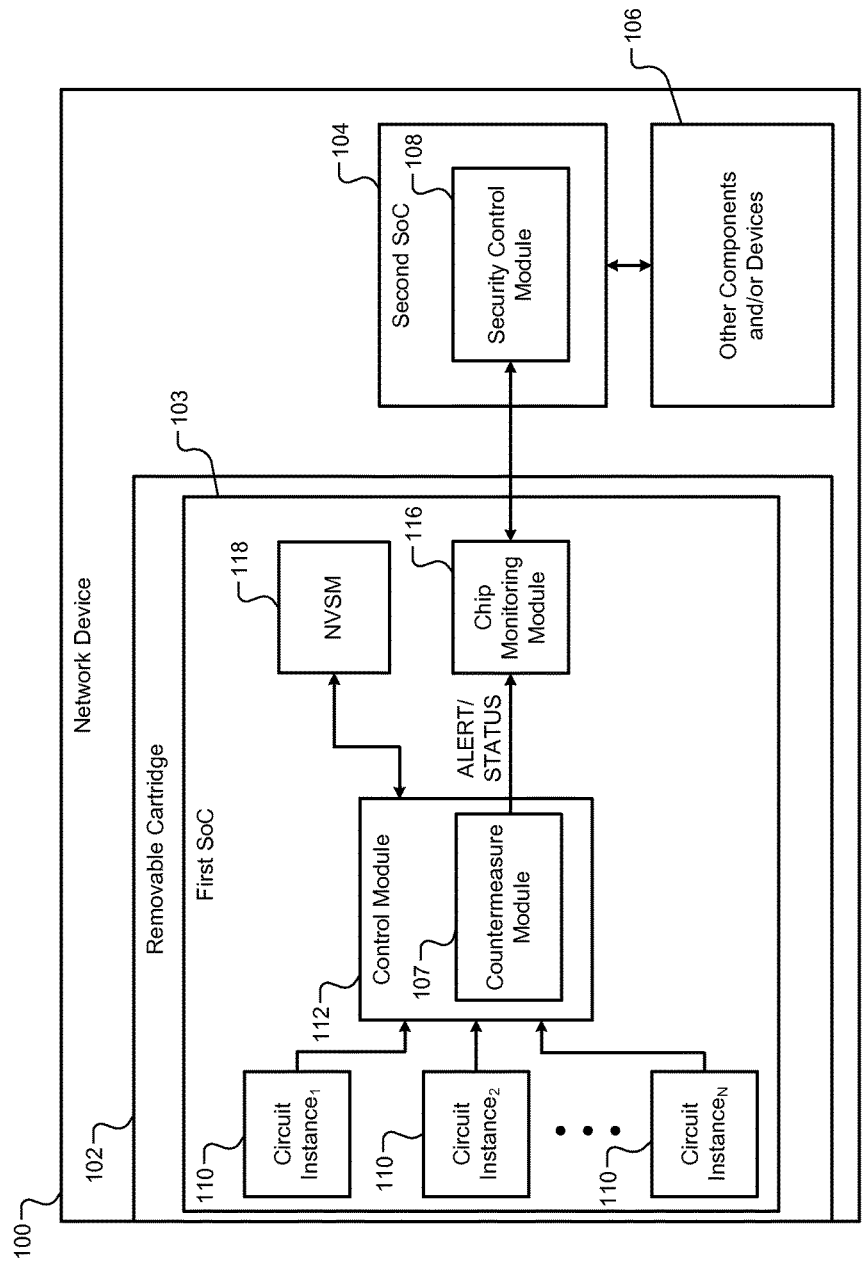
FIG. 4 is a functional block diagram of a network device incorporating a removable cartridge in accordance with the present disclosure.

FIG. 4 shows a network device 100 is shown for example purposes only and includes: a removable cartridge 102 having a first SoC 103; a second SoC 104; and other components and/or devices 106. The methods disclosed herein may be applied to the network device 100 and/or to other network devices that do not include removable cartridges. As an example, the network device 100 may be a printer and the removable cartridge 102 may be an ink cartridge. The first SoC 103 and the second SoC 104 may perform secure operations including transferring secure information and/or data between the SoCs 103, 104. The first SoC 103 may perform similar to the SoC 10 of FIG. 1 and provide an alert signal and/or a status signal, via a countermeasure module 107, to the second SoC 104. The second SoC 104, via a security control module 108, may then determine whether the first SoC 103 is a valid SoC based on the alert signal and/or the status signal. If the first SoC 103 is invalid, the security control module 108 may: prevent secure operations from being performed by the first SoC 103, prevent transfer of secure information and/or data to and from the second SoC 104; shutdown the first SoC 103; and/or perform other countermeasures. As another example, the network device 100 may be a computer or a hard disk drive and the removable cartridge 102 may be a flash drive or other removable device having solid-state memory.

The first SoC 103 may include any of the circuits, devices, and/or modules of the SoC 10. As shown, the first SoC 103 includes circuit instances 110, a control module 112 with the countermeasure module 107, a chip monitoring module 116 and a NVSM 118, which may operate similar to the circuit instances 16, the control module 18, the countermeasure module 46 and the NVSM 20 of the SoC 10.

The control module 112 may monitor states of the circuit instances 110 and generate a SF during manufacturing and a URC during field operations of the first SoC 103. The SF and the URC may be stored in the NVSM 118 and may be compared to determine whether the URC matches the SF. The alert signal and/or status signal may be generated based on the comparison via the countermeasure module 107 and provided to the chip monitoring module 116 and/or the second SoC 104. The other components and/or devices 106 may include, for example, printing mechanisms, hard disk drive components (e.g., a magnetic rotating medium), peripheral devices and/or other network device components.

Figure 5:
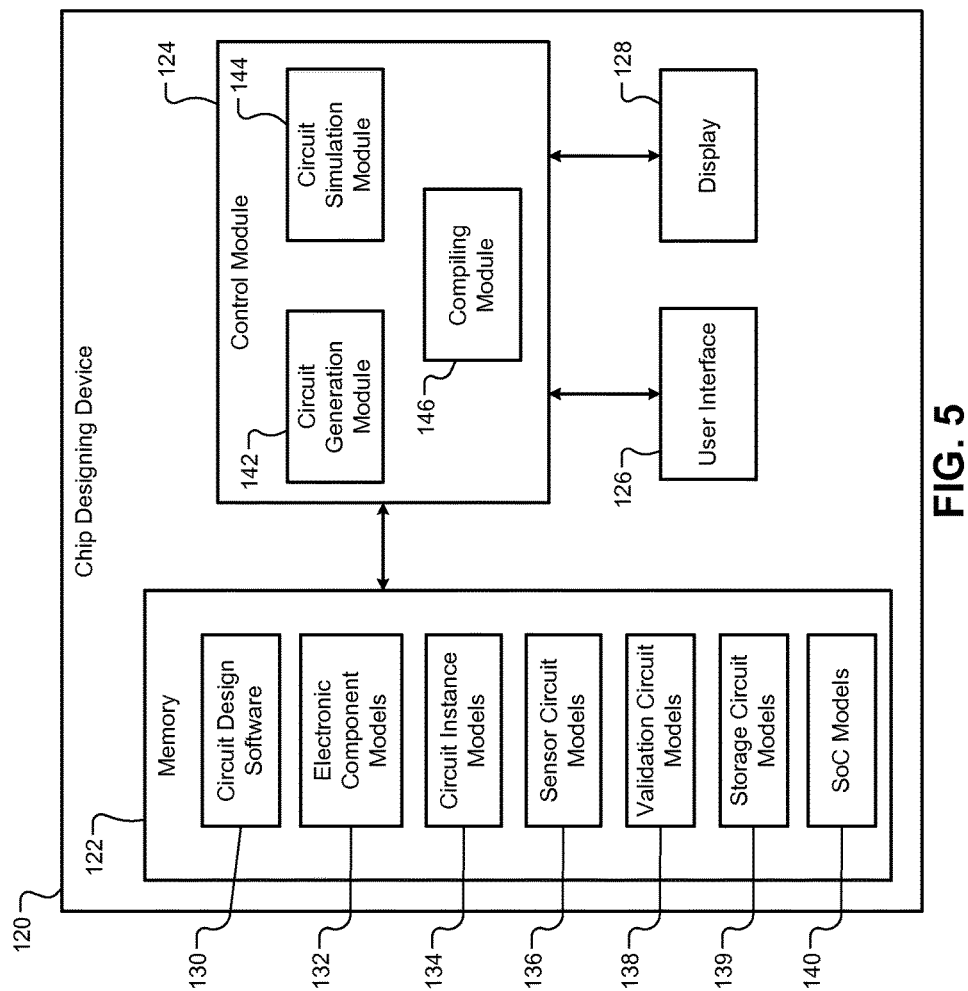
FIG. 5 is a functional block diagram of a chip designing device in accordance with an embodiment of the present disclosure.

FIG. 5 shows a chip designing device 120 that may include a memory 122, a control module 124, a user interface 126, and a display 128. The memory 122 may store: circuit design software 130, electronic component models 132; circuit instance models 134; sensor circuit models 136; validation circuit models 138; storage circuit models 139, and SoC models 140. The control module 124 may include a circuit generation module 142, a circuit simulation module 144, and a compiling module 146.

The circuit generation module 142 may execute the circuit design software to build models of electronic components, circuit instances, sensor circuits, validation circuits, and storage circuits. The models may be stored in the memory 122 and accessed and updated by the circuit generation module 142. The circuit generation module 142 may build a model of a SoC based on selected ones of the models 132, 134, 136, 138, and 139. The resultant model of the SoC may be stored in the memory 122. The resultant SoC may include multiples of a same circuit instance and/or sets of circuit instances, where each circuit instance in a set of circuit instances is the same as other circuit instances in that corresponding set of circuit instances.

The models stored in the memory 122 may be stored as source code generated by a high-level programming language. The compiling module 146 may include and/or be implemented as a compiler and may receive the source code from the circuit generation module 142 and may generate assembly code corresponding to a low-level programming language. The assembly code may be executed by the circuit simulation module 144. This may occur during simulated operation of a SoC. The models and/or corresponding simulation results may be displayed on the display 128.

The user interface 126 may include a keyboard and/or a mouse. The display 128 may include a touchscreen, which may be used as a user interface. The modules 142, 144, 146 may initiate and perform tasks based on inputs received from the user interface 126 and/or the display 128.

Figure 6:
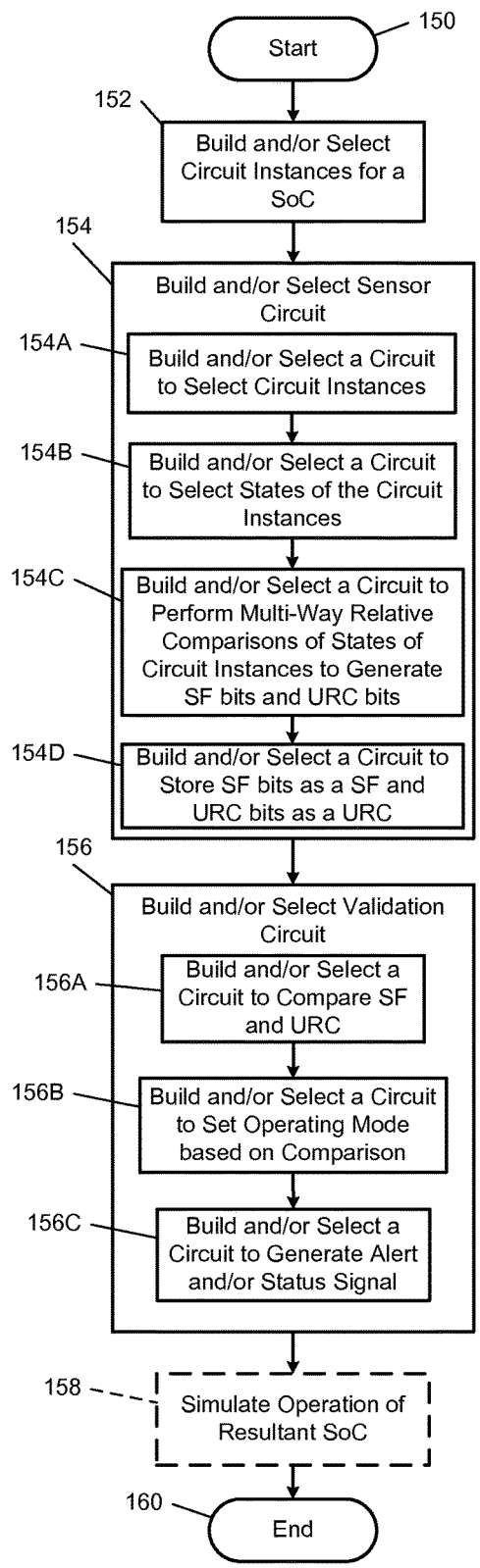
FIG. 6 illustrates a design method in accordance with an embodiment of the present disclosure.

FIG. 6 illustrates a design method. The design method may be performed by the control module 124 of FIG. 5. The method may begin at 150. At 152, the circuit generation module 142 may select models of electronic components and/or circuit instances from the memory 122 to build circuit instances of a SoC. The term "build" refers to generating a model of a circuit that can be displayed on the display 128 and used as a template to manufacture the SoC. At 154, the circuit generation module 142 may build and/or select a sensor circuit (e.g., the sensor circuit 22 of FIG. 1), which may be connected to the circuit instances. At 154A, the circuit generation module 142 may build and/or select a first circuit to select some or all of the circuit instances. The first circuit may be connected to some or all of the circuit instances. At 154B, the circuit generation module 142 may build and/or select a second circuit to select states of the circuit instances. The second circuit may be connected to some or all of the circuit instances. For example, the circuit generation module 142 may build and/or select the one of the selector modules, circuit instance modules, and/or multiplexers disclosed herein.

At 154C, the circuit generation module 142 may build and/or select a third circuit to perform multi-way relative comparisons of states of circuit instances to generate SF bits and URC bits. This may include building and/or selecting, for example, one of the comparing module 28, 58 and/or one of the comparators 42, 82 disclosed above. The third circuit may be connected to the second circuit.

At 154D, the circuit generation module 142 may build and/or select a fourth circuit for storing SF bits and URC bits. This may include building and/or selecting a storage circuit, such as one of the NVSMs 20, 118 and/or registers 34, 36 disclosed above. The fourth circuit may be connected to the third circuit.

At 156, the circuit generation module 142 may build and/or select a validation circuit (e.g., the validation circuit 24 of FIG. 1). The validation circuit may be connected to the fourth circuit. At 156A, the circuit generation module 142 may build and/or select a fifth circuit (e.g., the second comparing module 43) to compare a SF to a URC. The fifth circuit may be connected to the fourth circuit. At 156B, the circuit generation module 142 may build and/or select a sixth circuit (e.g., the mode module 44) to set an operating mode. The sixth circuit may be connected to the fifth circuit. At 156C, the circuit generation module 142 may build and/or select a seventh circuit (e.g., the countermeasure module 46) to perform a countermeasure. The seventh circuit is connected to the sixth circuit.

At 158, the circuit simulation module 144 may simulate operation of the resultant SoC generated based on tasks 152-156. In one embodiment, task 158 is not performed. The method may end at 160.

Figure 7:
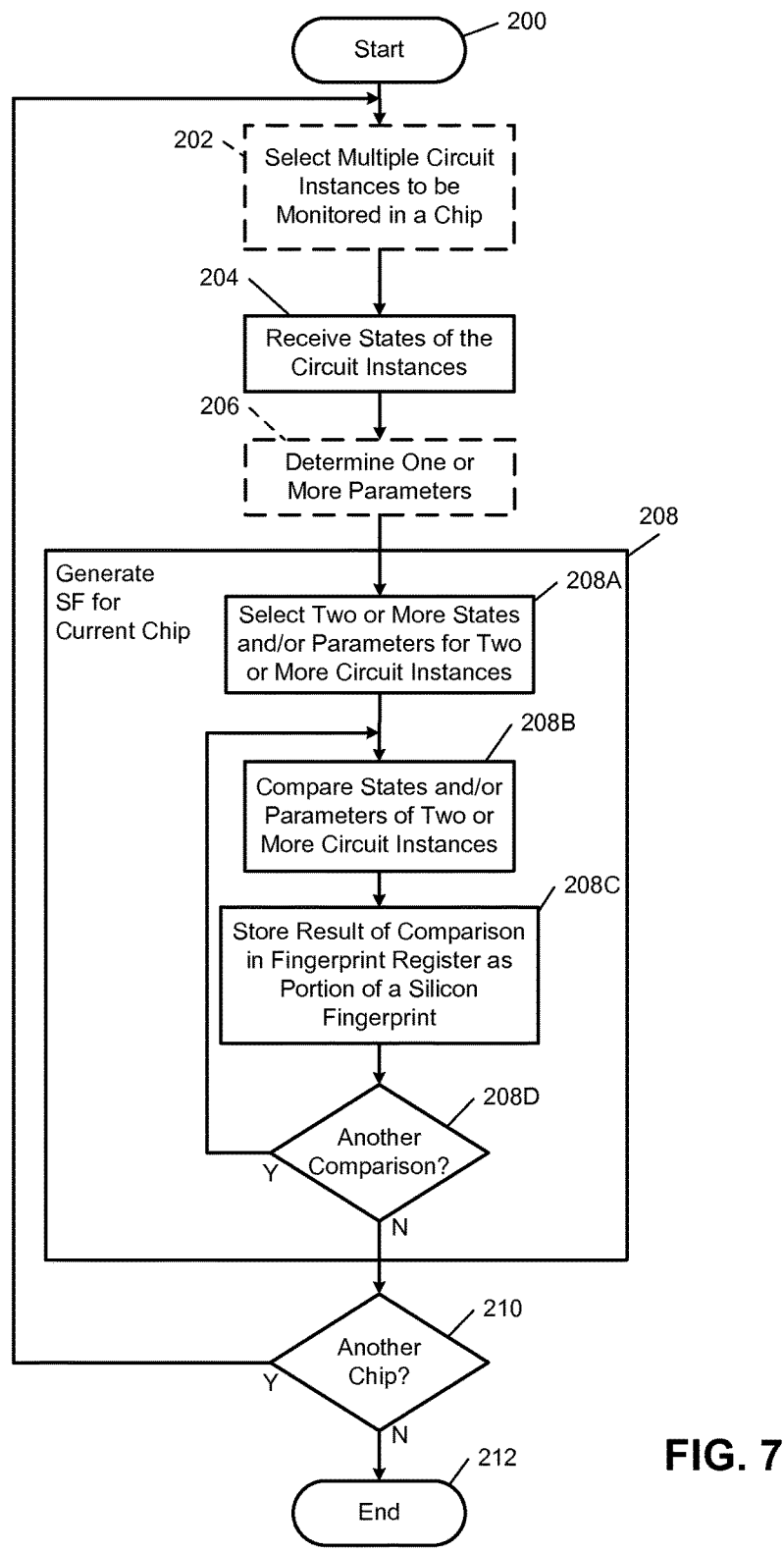
FIG. 7 illustrates a URC generation method in accordance with an embodiment of the present disclosure.
Figure 8:
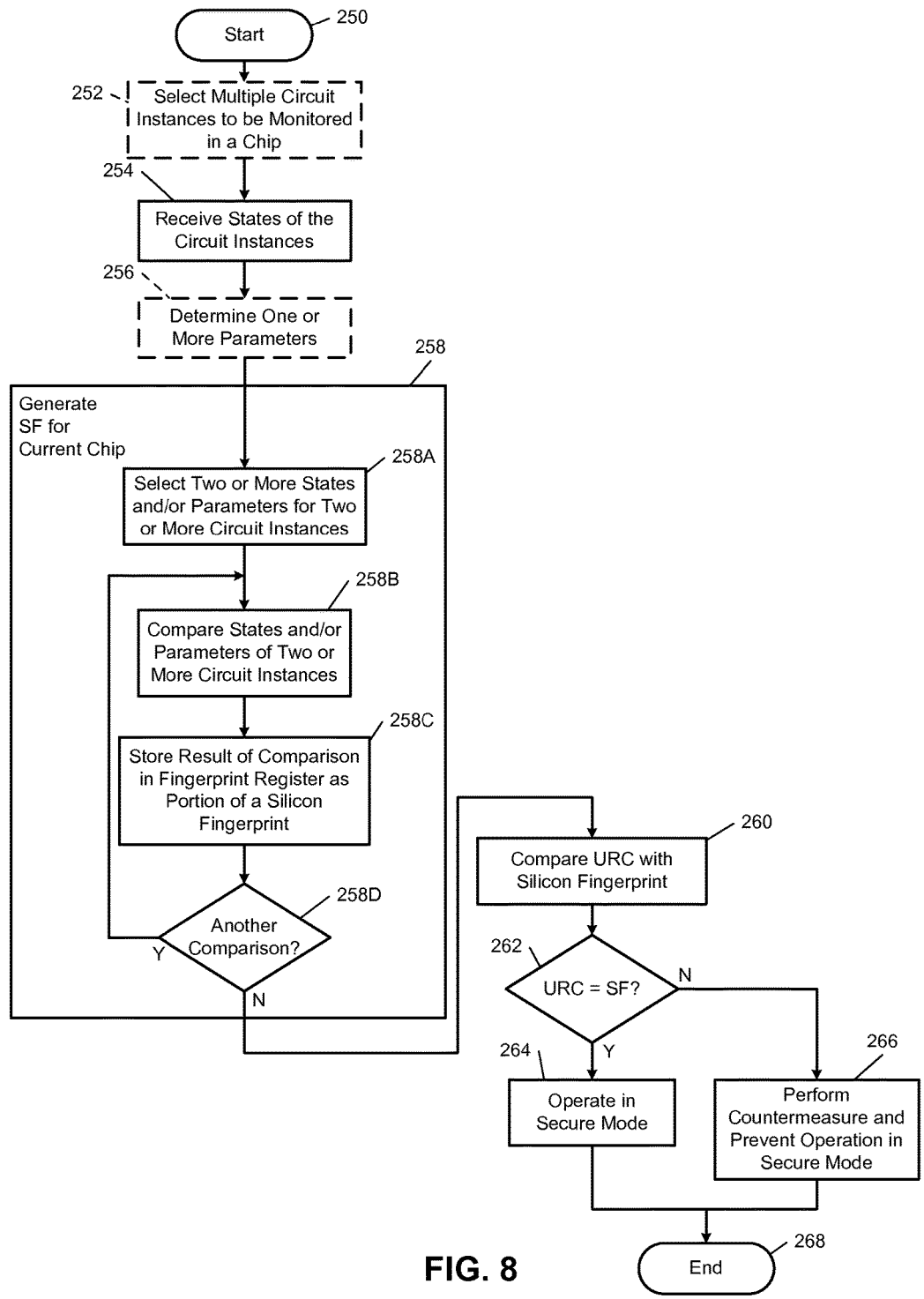
FIG. 8 illustrates a URC validation method in accordance with an embodiment of the present disclosure.

The SoCs and corresponding URC systems disclosed herein may be operated using numerous methods, example methods are illustrated in FIGS. 7-8. In FIG. 7, a URC generation method is shown. Although the following tasks are primarily described with respect to the implementations of FIGS. 1-4, the tasks may be easily modified to apply to other implementations of the present disclosure. The tasks may be iteratively performed.

The method may begin at 200. At 202, a control module (e.g., the control module 18) of a SoC selects two or more circuit instances (e.g., two or more of the circuit instances 16, the ring oscillators 53, and the circuit instances 72) of a SoC. The circuit instances may be predesigned into the SoC and/or a circuit instance module (e.g., one of the circuit instance modules 26 and 54) may select two or more nodes in the SoC to monitor. One or more of the above-disclosed parameters of each of the nodes may be monitored. This allows outputs and/or operating states of the circuit instances to be monitored. A selector module (e.g., one of the selector modules 30, 60, 84) of the control module may select the two or more nodes based on a predetermined algorithm, randomly, pseudo-randomly, a predetermined order, and/or based on another suitable selection criterion. Task 202 may include turning ON and/or raising a voltage of a voltage rail (e.g., the voltage rail 75) to allow the selected nodes and/or corresponding parameters to be sampled.

At 204, receive outputs of circuit instances and/or states of the selected nodes at the circuit instance module and/or a multiplexer (e.g., one of the multiplexers 40, 56, 80). This may include receiving voltages of and/or current from the selected nodes. Although the methods disclosed herein are primarily described with respect to monitoring outputs of the circuit instances, inputs and/or intermediary nodes of the circuit instances may be monitored.

At 206, the circuit instance module may determine one or more parameters based on the states of the selected nodes. For example, the circuit instance module may determine output frequencies of the selected nodes based on voltages received from the selected nodes.

At 208, a silicon fingerprint (SF) for a current SoC is generated based on the states and/or parameters of the selected nodes. At 208A, the circuit instance module and/or the multiplexer selects two or more of the states of the selected nodes and/or parameters for two or more of the circuit instances based on a selection signal received from the selector module.

At 208B, a comparing module (e.g., the comparing module 28 or one of the comparators 42, 82) compares the two or more states and/or parameters to generate a SF bit, as described above. As an example, the comparing module may (i) compare output voltages and/or output frequencies of the circuit instance module and/or multiplexer, and (ii) provide the SF bit based on the comparison. The comparisons may be pair-wise unique comparisons. In other words, no two comparisons include parameter values corresponding to (i) the same circuit instances, and/or (ii) the same two or more nodes of the same circuit instances. For example, pair-wise unique comparisons are generated for 5 states respectively of 5 circuit instances, then a total of 10 comparison results may be provided. Continuing from the same example, if the comparisons are not pair-wise unique, then 20 comparison results may be generated.

At 208C, the SF bit is stored in, for example, a SF shift register (e.g., the SF shift register 34) of a NVSM (e.g., the NVSM 20).

At 208D, the selector module and/or the control module determines whether another comparison is to be performed. If another comparison is to be performed, task 208A is performed, otherwise task 210 is performed.

At 210, the control module determines whether to evaluate another chip. If another chip is to be evaluated, task 202 may be performed, otherwise the method may end at 212.

FIG. 8 shows a URC validation method. This method may be performed to evaluate a chip (e.g., the SoC 10 of FIG. 1) during "in-field" operations. During this method, a current URC of the chip may be generated and compared to a SF generated and saved on the chip during manufacturing of the chip. The SF may have been generated using the method of FIG. 7. Although the following tasks are primarily described with respect to the implementations of FIGS. 1-4, the tasks may be easily modified to apply to other implementations of the present disclosure. The tasks may be iteratively performed.

The method may begin at 250 and may be triggered based on different conditions. As an example, a control module (e.g., the control module 18), a chip monitoring module (e.g., the chip monitoring module 51), and/or a central monitoring device (e.g., the central monitoring device 14) may trigger the method. The method may be triggered every predetermined and/or periodic interval. The method may be triggered when the chip is initiated or powered ON. The method may begin if a predetermined criterion is satisfied and/or suspicious activity is detected. The method may not be triggered, for example, when: the chip is not in a stable operating state; a temperature of the chip is fluctuating; and/or the chip is performing tasks that would not allow an accurate URC to be generated.

At 252, the control module of the chip selects two or more circuit instances (two or more of the circuit instances 16, ring oscillators 53, and circuit instances 72) of a chip. This selection is the same as the selection performed at task 202 of FIG. 7. If this selection is not the same then a resulting URC may not match a stored SF. The circuit instances may be predesigned into the SoC and/or a circuit instance module (e.g., one of the circuit instance modules 26 and 54) may select two or more nodes in the chip to monitor. One or more of the above-disclosed parameters of the nodes may be monitored. This allows outputs and/or operating states of the circuit instances to be monitored. A selector module (e.g., one of the selector modules 30, 60, 84) may select the two or more nodes based on a predetermined algorithm, randomly, pseudo-randomly, a predetermined order, and/or based on another suitable selection criterion. Task 252 may include turning ON and/or raising a voltage of a voltage rail (e.g., the voltage rail) to allow the selected nodes and/or corresponding parameters to be sampled.

At 254, receive outputs of circuit instances and/or states of the selected nodes at the circuit instance module and/or a multiplexer (e.g., one of the multiplexers 40, 56, 80). This may include receiving voltages and/or current of the selected nodes. Although the methods disclosed herein are primarily described with respect to monitoring outputs of the circuit instances, inputs and/or intermediary nodes of the circuit instances may be monitored.

At 256, the circuit instance module may determine one or more parameters based on the states of the selected nodes. For example, the circuit instance module may determine output frequencies of the selected nodes based on voltages received from the selected nodes. The parameters are the same as the parameters determined at task 206 of FIG. 8 to allow for a matching URC to be generated.

At 258, a unique response code (URC) for a current chip is generated based on the states and/or parameters of the selected nodes. At 258A, the circuit instance module and/or the multiplexer selects two or more of the states of the selected nodes and/or parameters for two or more of the circuit instances based on a selection signal received from a selector module (e.g., one of the selector modules 30, 60, 84). For each iteration of task 258A, the same states are selected as at task 208A to allow for a matching URC to be generated. Although the states of different iterations of task 258A may be different, the sequence (or order) in which the states are selected for the iterations of 258A is the same as the sequence the states were selected for the iterations of task 208A.

At 258B, a comparing module (e.g., the comparing module 28 or one of the comparators 42, 82) compares the two or more states and/or parameters to generate a URC bit, as described above. As an example, the comparing module may (i) compare output voltages and/or output frequencies of the circuit instance module and/or multiplexer, and (ii) provide the URC bit based on the comparison. The comparisons may be pair-wise unique comparisons. A sequence for which the comparisons are performed over the iterations of task 258B is the same as the sequence for which the comparisons were performed for the iterations of task 208B of FIG. 7 to allow for a matching URC to be generated.

At 258C, the SF bit is stored in, for example, a SF shift register (e.g., the SF shift register 34) of a NVSM (e.g., the NVSM 20). At 258D, the selector module and/or the control module determines whether another comparison is to be performed. If another comparison is to be performed, task 258A is performed, otherwise task 260 is performed.

At 260, a second comparing module (e.g., the second comparing module 43) compares the SF stored on the chip to the URC generated at 258. The second comparing module may access the SF and the URC from the NVSM and perform the comparison to generate the comparison signal MATCH.

At 262, a mode module (e.g., the mode module 44) determines whether the URC matches the SF. This may include determining whether a predetermined number and/or all of the bits of the URC match corresponding bits of the SF. If the URC matches the SF, then task 264 is performed, otherwise task 266 is performed. The mode module generates the security signal MODE, which may indicate (i) whether the predetermined number and/or all of the bits of the URC match corresponding bits of the SF, and/or (ii) whether to operate in the secure mode. At 264, the control module operates in the secure mode.

At 266, a countermeasure module (e.g., the countermeasure module 46) and the control module do not operate in the secure mode. The countermeasure module may perform a countermeasure, such as generating the alert and/or status signal. The alert signal indicates the predetermined number and/or all of the bits of the URC do not match the corresponding bits of the SF. The status signal may indicate results of the comparison between the URC and the SF. This may include the number of bits of the URC that match the number of bits the SF. This may also indicate (i) which bits of the URC match correspond bits of the SF, and/or (ii) which bits of the URC that do not match corresponding bits of the SF. The alert and/or status signal may be transmitted via the MAC module and the PHY module to the central monitoring device. The method may end at 268.

The above-described tasks of FIGS. 6-8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system-on-chip comprising:
a plurality of circuit instances having respectively a first plurality of nodes, wherein the plurality of circuit instances are designed to provide nominally a same value at each of the first plurality of nodes;
a selector module configured to generate a first selection signal;
a circuit instance module configured to (i) monitor a plurality of states of the first plurality of nodes, and (ii) based on the first selection signal, select (a) two or more of the plurality of states of the first plurality of nodes, or (b) two or more parameter values generated based on the two or more of the plurality of states of the first plurality of nodes;
a first comparing module configured to
compare (i) the two or more of the states of the first plurality of nodes, or (ii) the two or more parameter values, and
based on the comparison, output a first bit of (i) a silicon fingerprint of the system-on-chip, or (ii) a unique response code of the system-on-chip;
a second comparing module configured to generate a comparison signal based on a comparison between the silicon fingerprint and the unique response code;
a mode module configured to operate in a secure mode based on the comparison signal; and
a countermeasure module configured to, based on the comparison signal, perform a countermeasure.

2. The system-on-chip of claim 1, wherein:
the selector module is configured to generate a plurality of selection signals;
the plurality of selection signals includes the first selection signal and a second selection signal;
the circuit instance module is configured to
during generation of the first bit of the silicon fingerprint or the unique response code and based on the first selection signal, select a first state of a first node and a state of a second node, and
during generation of a second bit of the silicon fingerprint or the unique response code and based on the second selection signal, select a second state of the first node and a state of a third node;
the first plurality of nodes comprise the first node, the second node and the third node; and
the first comparing module is configured to (i) compare the first state of the first node to the state of the second node to generate the first bit, and (ii) compare the second state of the first node to the state of the third node to generate the second bit.

3. The system-on-chip of claim 2, wherein the first state of the first node, the second state of the first node, the state of the second node, and the state of the third node are voltages of resistance capacitance circuits.

4. The system-on-chip of claim 1, wherein:
the selector module is configured to generate a plurality of selection signals;

the plurality of selection signals includes the first selection signal and a second selection signal;
the circuit instance module is configured to
during generation of the first bit of the silicon fingerprint or the unique response code and based on the first selection signal, (i) generate a first parameter value based on a first state of a first node, and (ii) generate a second parameter value based on a state of a second node, and
during generation of a second bit of the silicon fingerprint or the unique response code and based on the second selection signal, (i) generate a third parameter value based on a second state of the first node, and (ii) generate a fourth parameter value based on a state of a third node;
the first plurality of nodes comprise the first node, the second node and the third node; and
the first comparing module is configured to (i) compare the first parameter value and the second parameter value to generate the first bit, and (ii) compare the third parameter value and the fourth parameter value to generate the second bit.

5. The system-on-chip of claim 4, wherein the first parameter value, the second parameter value, the third parameter value, and the fourth parameter value are frequencies.

6. The system-on-chip of claim 1, further comprising a control module configured to, prior to the circuit instance module monitoring the first plurality of nodes, select the first plurality of nodes from a second plurality of nodes in the system-on-chip.

7. The system-on-chip of claim 1, further comprising:
a memory;
the first comparing module is configured to, during a first iteration, (i) perform a first comparison (a) to compare the two or more of the plurality of states of the first plurality of nodes, or (b) the two or more parameter values, and (ii) based on the first comparison, storing the first bit of the silicon fingerprint of the system-on-chip in the memory; and
the first comparing module is configured to, during a second iteration, (i) perform a second comparison between (a) updated versions of the two or more of the plurality of states of the first plurality of nodes, or (b) updated versions of the two or more parameter values, and (ii) based on the second comparison, storing a second bit of the unique response code of the system-on-chip in the memory.

8. The system-on-chip of claim 1, wherein the first comparing module is configured to iteratively update the unique response code based on (a) corresponding updated versions of the two or more of the states of the first plurality of nodes, or (b) corresponding updated versions of the two or more parameter values.

9. The system-on-chip of claim 1, wherein the first comparing module is configured to (i) generate the silicon fingerprint based on (a) the two or more of the states of the first plurality of nodes, or (b) the two or more parameter values, and (ii) generate the unique response code based on (a) updated versions of the two or more of the states of the first plurality of nodes, or (b) updated versions of the two or more parameter values.

10. The system-on-chip of claim 1 wherein:
each of the first plurality of nodes of the plurality of circuit instances is connected to the circuit instance module; and
the state of each of the first plurality of nodes is independent of the states of the other ones of the first plurality of nodes.

11. The system-on-chip of claim 1, wherein:
the circuit instance module comprises a multiplexer;
the multiplexer is configured to (i) receive outputs of the circuit instances, and (ii) output two or more of the outputs based on the selection signal;
the two or more outputs have the two or more states of the first plurality of nodes; and
the first comparing module is configured to compare the two or more outputs.

12. The system-on-chip of claim 1, wherein each of the plurality of states is a state of a respective one of the first plurality of nodes.

13. A method of operating a system-on-chip, wherein the system-on-chip includes a plurality of circuit instances having respectively a first plurality of nodes, and wherein the plurality of circuit instances are designed to provide nominally a same value at each of the plurality of nodes, the method comprising:
generate a first selection signal;
monitoring a plurality of states of the first plurality of nodes;
based on the first selection signal, selecting (a) two or more of the plurality of states of the first plurality of nodes, or (b) two or more parameter values generated based on the two or more of the plurality of states of the first plurality of nodes;
comparing (i) the two or more of the states of the first plurality of nodes, or (ii) the two or more parameter values;
based on the comparison, generating a first bit of (i) a silicon fingerprint of the system-on-chip, or (ii) a unique response code of the system-on-chip;
generating a comparison signal based on a comparison between the silicon fingerprint and the unique response code;
operating in a secure mode based on the comparison signal; and
based on the comparison signal, performing a countermeasure.

14. The method of claim 13, further comprising:
generating a plurality of selection signals, wherein the plurality of selection signals includes the first selection signal and a second selection signal;
during generation of the first bit of the silicon fingerprint or the unique response code and based on the first selection signal, selecting a first state of a first node and a state of a second node, and
during generation of a second bit of the silicon fingerprint or the unique response code and based on the second selection signal, selecting a second state of the first node and a state of a third node,
wherein the first plurality of nodes comprise the first node, the second node and the third node;
comparing the first state of the first node to the state of the second node to generate the first bit; and
comparing the second state of the first node to the state of the third node to generate the second bit.

15. The method of claim 14, wherein the first state of the first node, the second state of the first node, the state of the second node, and the state of the third node are voltages of resistance capacitance circuits.

16. The method of claim 13, further comprising:
generating a plurality of selection signals, wherein the plurality of selection signals includes the first selection signal and a second selection signal;
during generation of the first bit of the silicon fingerprint or the unique response code and based on the first selection signal, (i) generating a first parameter value based on a first state of a first node, and (ii) generating a second parameter value based on a state of a second node;
during generation of a second bit of the silicon fingerprint or the unique response code and based on the second selection signal, (i) generating a third parameter value based on a second state of the first node, and (ii) generating a fourth parameter value based on a state of a third node,
wherein the first plurality of nodes comprise the first node, the second node and the third node;
comparing the first parameter value and the second parameter value to generate the first bit; and
comparing the third parameter value and the fourth parameter value to generate the second bit.

17. The method of claim 16, wherein the first parameter value, the second parameter value, the third parameter value, and the fourth parameter value are frequencies.

18. The method of claim 13, further comprising, prior to the monitoring of the first plurality of nodes, selecting the first plurality of nodes from a second plurality of nodes in the system-on-chip.

19. The method of claim 13, further comprising:
during a first iteration, (i) performing a first comparison (a) to compare the two or more of the plurality of states of the first plurality of nodes, or (b) the two or more parameter values, and (ii) based on the first comparison, storing the first bit of the silicon fingerprint of the system-on-chip in a memory; and
during a second iteration, (i) performing a second comparison between (a) updated versions of the two or more of the plurality of states of the first plurality of nodes, or (b) updated versions of the two or more parameter values, and (ii) based on the second comparison, storing a second bit of the unique response code of the system-on-chip in the memory.

20. The method of claim 13, further comprising iteratively updating the unique response code based on (a) corresponding updated versions of the two or more of the states of the first plurality of nodes, or (b) corresponding updated versions of the two or more parameter values.

21. The method of claim 13, further comprising:
generating the silicon fingerprint based on (a) the two or more of the states of the first plurality of nodes, or (b) the two or more parameter values; and
generating the unique response code based on (a) updated versions of the two or more of the states of the first plurality of nodes, or (b) updated versions of the two or more parameter values.

* * * * *